US010450894B2

United States Patent
Witlicki et al.

(10) Patent No.: US 10,450,894 B2
(45) Date of Patent: Oct. 22, 2019

(54) BEARING COMPARTMENT SCAVENGE CONTROL

(71) Applicant: United Technologies Corporation, Farmington, CT (US)

(72) Inventors: Russell B. Witlicki, Wethersfield, CT (US); Joseph J. Sodaro, Vernon, CT (US); Denman H. James, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 333 days.

(21) Appl. No.: 15/362,049

(22) Filed: Nov. 28, 2016

(65) Prior Publication Data

US 2018/0149040 A1    May 31, 2018

(51) Int. Cl.
| | | |
|---|---|---|
| *F01D 25/18* | (2006.01) | |
| *F01D 25/16* | (2006.01) | |
| *F01D 25/32* | (2006.01) | |
| *F16N 7/32* | (2006.01) | |
| *F16N 7/40* | (2006.01) | |

(52) U.S. Cl.
CPC ......... *F01D 25/186* (2013.01); *F01D 25/168* (2013.01); *F01D 25/18* (2013.01); *F01D 25/32* (2013.01); *F05D 2240/50* (2013.01); *F05D 2260/602* (2013.01); *F05D 2260/98* (2013.01); *F05D 2270/304* (2013.01); *F16N 7/32* (2013.01); *F16N 7/40* (2013.01); *F16N 2210/02* (2013.01); *F16N 2210/14* (2013.01)

(58) Field of Classification Search
CPC ........ F01D 25/186; F01D 25/18; F01D 25/32; F01D 25/168; F16N 2210/02; F16N 2210/14; F16N 7/32; F16N 7/40; F05D 2270/304; F05D 2260/98; F05D 2240/50; F05D 2260/602

See application file for complete search history.

(56) References Cited

U.S. PATENT DOCUMENTS

| | | | | |
|---|---|---|---|---|
| 2,604,188 | A |   | 7/1952 | Marchant |
| 3,486,582 | A |   | 12/1969 | Carter |
| 4,170,873 | A | * | 10/1979 | Milo ....................... F01D 25/20 |
| | | | | 184/6.11 |
| 4,433,539 | A | * | 2/1984 | Norris ..................... F01D 25/18 |
| | | | | 184/6.11 |
| 4,576,001 | A |   | 3/1986 | Smith |
| 4,844,202 | A | * | 7/1989 | Maresko ............. F16H 57/0413 |
| | | | | 184/6.12 |
| 4,891,934 | A |   | 1/1990 | Huelster |
| 4,953,663 | A | * | 9/1990 | Sugden ..................... F16N 7/40 |
| | | | | 184/6.12 |

(Continued)

OTHER PUBLICATIONS

EP search report for EP17193405.2 dated May 9, 2018.

*Primary Examiner* — Joseph J Dallo
(74) *Attorney, Agent, or Firm* — O'Shea Getz P.C.

(57) ABSTRACT

Aspects of the disclosure are directed to a system associated with an engine, comprising: a bearing compartment, a scavenge line coupled to the bearing compartment at a first end of the scavenge line that receives a fluid via the first end of the scavenge line, a fluid pump coupled to the scavenge line at a second end of the scavenge line to receive the fluid, and a flow control valve having a variable flow area and disposed in the scavenge line to control flow of the fluid in the scavenge line and the fluid pump.

17 Claims, 5 Drawing Sheets

(56) References Cited

U.S. PATENT DOCUMENTS

| | | | |
|---|---|---|---|
| 5,526,640 A * | 6/1996 | Brooks | F01D 25/16 60/745 |
| 6,886,665 B2 | 5/2005 | Parsons | |
| 8,051,869 B2 | 11/2011 | Parnin | |
| 8,602,165 B2 | 12/2013 | Szolomayer | |
| 8,893,469 B2 | 11/2014 | DiBenedetto | |
| 2006/0081419 A1 | 4/2006 | Care et al. | |
| 2009/0101444 A1* | 4/2009 | Alecu | F01D 25/18 184/11.2 |
| 2010/0012434 A1 | 1/2010 | Pisseloup | |
| 2010/0143094 A1 | 6/2010 | Pisseloup | |
| 2010/0154427 A1* | 6/2010 | Logan | F01D 25/18 60/772 |
| 2012/0315137 A1* | 12/2012 | Alvarez | F01D 25/18 415/229 |
| 2013/0048091 A1 | 2/2013 | DiBenedetto et al. | |
| 2016/0032772 A1 | 2/2016 | Sheridan et al. | |
| 2016/0237899 A1* | 8/2016 | Denman | F01D 25/20 |

* cited by examiner

BEARING COMPARTMENT SCAVENGE CONTROL

STATEMENT REGARDING FEDERALLY SPONSORED RESEARCH OR DEVELOPMENT

This invention was made with government support under contract number FA8650-09-D-2923-0021 awarded by the United States Air Force. The government has certain rights in the invention.

BACKGROUND

Gas turbine engines, such as those which power aircraft and industrial equipment, employ a compressor to compress air that is drawn into the engine and a turbine to capture energy associated with the combustion of a fuel-air mixture. A bearing compartment, and associated bearings, provides support for one or more structures of the engine, such as for example rotating shafts of the engine.

Referring to FIG. 2A, a prior art system 200 for scavenging oil is shown. Oil from one or more input sources is provided to a bearing compartment 204 to clean, cool, and lubricate the bearing(s) contained therein. Seals 210a and 210b are coupled to the bearing compartment 204. At least during steady state/idle conditions associated with the operation of the engine, the seals 210a and 210b are provided buffer air (typically sourced from the compressor) that is at a higher pressure than the pressure of the bearing compartment 204. This high pressure air, in conjunction with the seals 210a and 210b themselves, helps to retain oil in the bearing compartment 204. In other words, the high pressure buffer air, in conjunction with the seals 210a and 210b, keeps the oil from leaking out of the bearing compartment 204. Secondary seals 216a and 216b may be used to further encourage the buffer air to enter the bearing compartment 204 via the seals 210a and 210b.

During the steady state/idle conditions described above, a valve 222 disposed in a scavenge line 228 may be substantially closed (the valve 222 may remain partially open so as to continue to provide a threshold amount of oil to a fluid reservoir/sink 234 coupled to the scavenge line 228, where the sink 234 may include or be coupled to a gearbox or other components/devices, and where the sink 234 may be coupled to the source of the oil that is provided to the bearing compartment 204 in a closed-loop manner). The substantial closure of the valve 222 may provide a restriction to the flow of oil and air from the bearing compartment 204 to the sink 234 by way of the scavenge line 228. This restriction in the flow pressurizes the bearing compartment 204 and reduces the differential pressure across the seals 210a and 210b, thereby extending the operational lifetime and reliability of the seals 210a and 210b, as well as reducing heat generation.

Upon a snap/transient condition (e.g., a rapid deceleration of the engine), the pressure associated with the buffer air may drop appreciably. To counter this, the valve 222 may be fully opened in an effort to provide minimal restriction to the flow of oil and air out of the bearing compartment 204. However, the rate at which the source buffer air pressure drops may be significantly greater than the rate at which the bearing compartment 204 is able to depressurize via the valve 222/scavenge line 228, such that a negative (reversed) differential pressure may exist across the seals 210a and 210b and the risk of oil leaking out of the bearing compartment 204 is elevated (e.g., is greater than a threshold).

FIG. 2B illustrates another prior art system 250 for scavenging oil. The system 250 includes many of the same components/devices described above with respect to the system 200 of FIG. 2A. As shown in FIG. 2B, the system 250 includes a scavenge pump 278 in lieu of relying on compartment pressure to scavenge the compartment. If the pump 278 capacity/flow rate is small (e.g., less than a threshold), the system 250 may provide for a desirably small differential pressure across the seals 210a and 210b during steady state/idle conditions; however, upon the occurrence of a snap/transient condition as described above the pump 278 may be ineffective in depressurizing the bearing compartment 204, which may result in leaking oil. On the other hand, if the pump 278 capacity/flow rate is large (e.g., greater than a threshold), the system 250 may be able to quickly depressurize the bearing compartment 204 upon the occurrence of a snap/transient condition. However, during steady state/idle conditions there may be an unnecessarily/undesirably large differential pressure that may exist across the seals 210a and 210b.

Accordingly, what is needed is an ability to minimize/reduce the differential pressure across the seals of a bearing compartment during a steady state/idle condition on the one hand, yet an ability to quickly depressurize the bearing compartment during a snap/transient condition on the other hand.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a system associated with an engine, comprising: a bearing compartment, a scavenge line coupled to the bearing compartment at a first end of the scavenge line that receives a fluid via the first end of the scavenge line, a fluid pump coupled to the scavenge line at a second end of the scavenge line to receive the fluid, and a flow control valve having a variable flow area and disposed in the scavenge line to control flow of the fluid in the scavenge line and the fluid pump. In some embodiments, the system further comprises a seal, wherein the seal provides air to the bearing compartment during a steady state condition associated with an operation of the engine. In some embodiments, the air is provided by a compressor section of the engine. In some embodiments, a flow control mechanism of the flow control valve is substantially or fully closed during the steady state condition. In some embodiments, the flow control valve includes at least one bypass orifice that provides at least a portion of the fluid through the flow control valve during the steady state condition. In some embodiments, a flow control mechanism of the flow control valve controls the variable flow area and is at least partially open during a transient condition associated with the operation of the engine. In some embodiments, the transient condition corresponds to a deceleration of the engine. In some embodiments, the system further comprises a fluid reservoir that receives fluid from the fluid pump. In some embodiments, the fluid reservoir includes a gearbox. In some embodiments, the system further comprises first and second seals coupled to the bearing compartment. In some embodiments, the system further comprises a third seal coupled to the first seal, and a fourth seal coupled to the second seal. In some embodiments, the system further comprises a second scavenge line coupled to the bearing compartment at a first end of the second scavenge line, and a second fluid pump coupled to the second scavenge line at a second end of the second scavenge line. In some embodiments, the system further comprises a first fluid reservoir coupled to the pump, and a second fluid reservoir coupled to the second pump. In some embodiments, the first fluid reservoir and the second fluid reservoir are common with one another. In some embodiments, the first fluid reservoir is different from the second fluid reservoir. In some embodiments, a first maximum flow capacity of the fluid pump is greater than a second maximum flow capacity of the second fluid pump. In some embodiments, a first value of a parameter of the scavenge line is different from a second value of the parameter of the second scavenge line. In some embodiments, the parameter is one of a length, a diameter, or a material.

BRIEF DESCRIPTION OF THE DRAWINGS

The present disclosure is illustrated by way of example and not limited in the accompanying figures in which like reference numerals indicate similar elements. The drawing figures are not necessarily drawn to scale unless specifically indicated otherwise.

DETAILED DESCRIPTION

Figure 1:
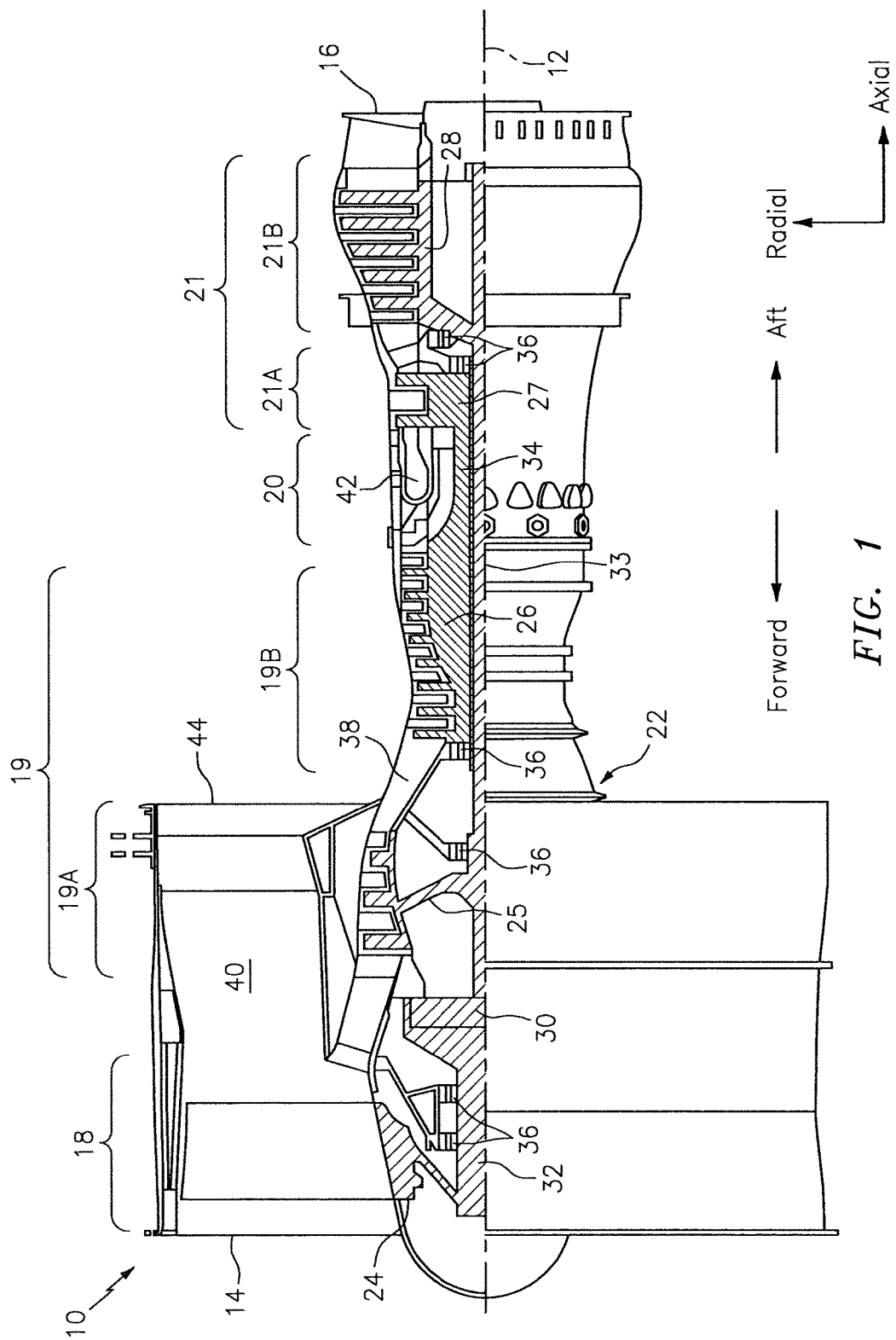
FIG. 1 is a side cutaway illustration of a geared turbine engine.

It is noted that various connections are set forth between elements in the following description and in the drawings (the contents of which are incorporated in this specification by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities or a space/gap between the entities that are being coupled to one another.

Aspects of the disclosure are directed to apparatuses, systems, and methods associated with a bearing compartment. In some embodiments, oil and air may be scavenged from the bearing compartment using at least one valve and one or more pumps. The state of the valve (e.g., the degree to which the value is open, or analogously, closed) may dictate the extent to which the bearing compartment is pressurized (or analogously, depressurized).

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines. Aspects of the disclosure may be applied in connection with non-geared engines.

Figure 2A:
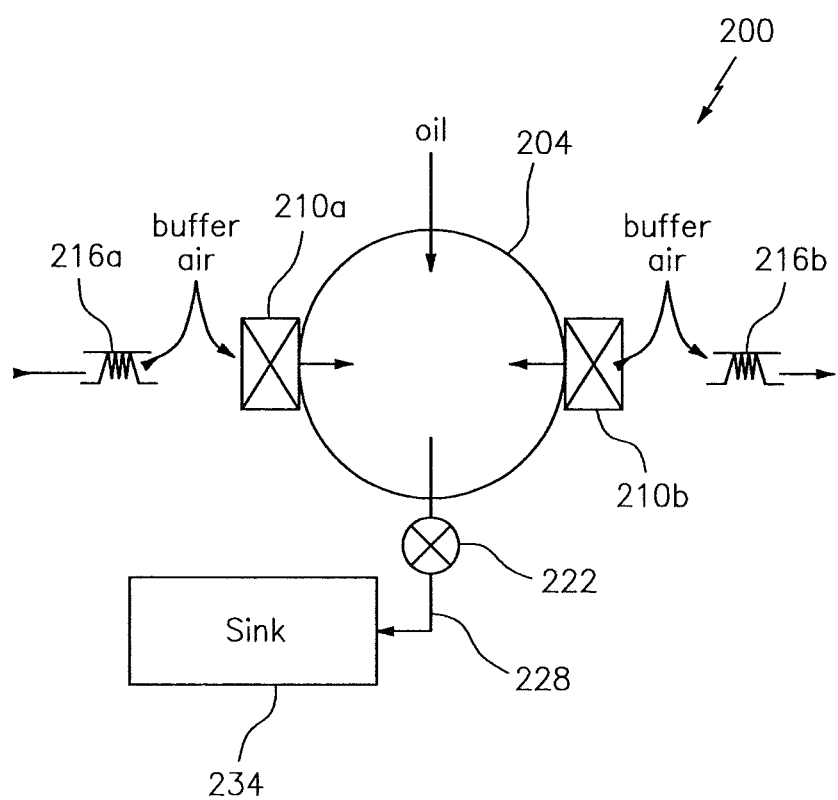
FIG. 2A illustrates a prior art system for scavenging oil from a bearing compartment using a valve.
Figure 2B:
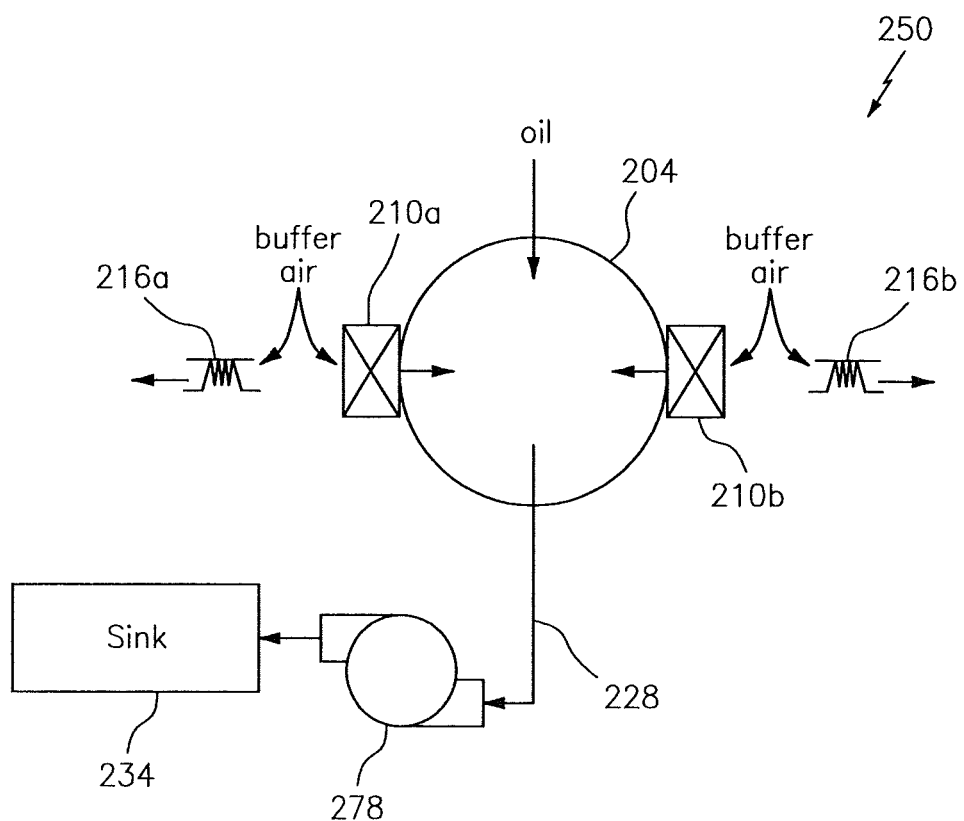
FIG. 2B illustrates a prior art system for scavenging oil from a bearing compartment using a pump.
Figure 3:
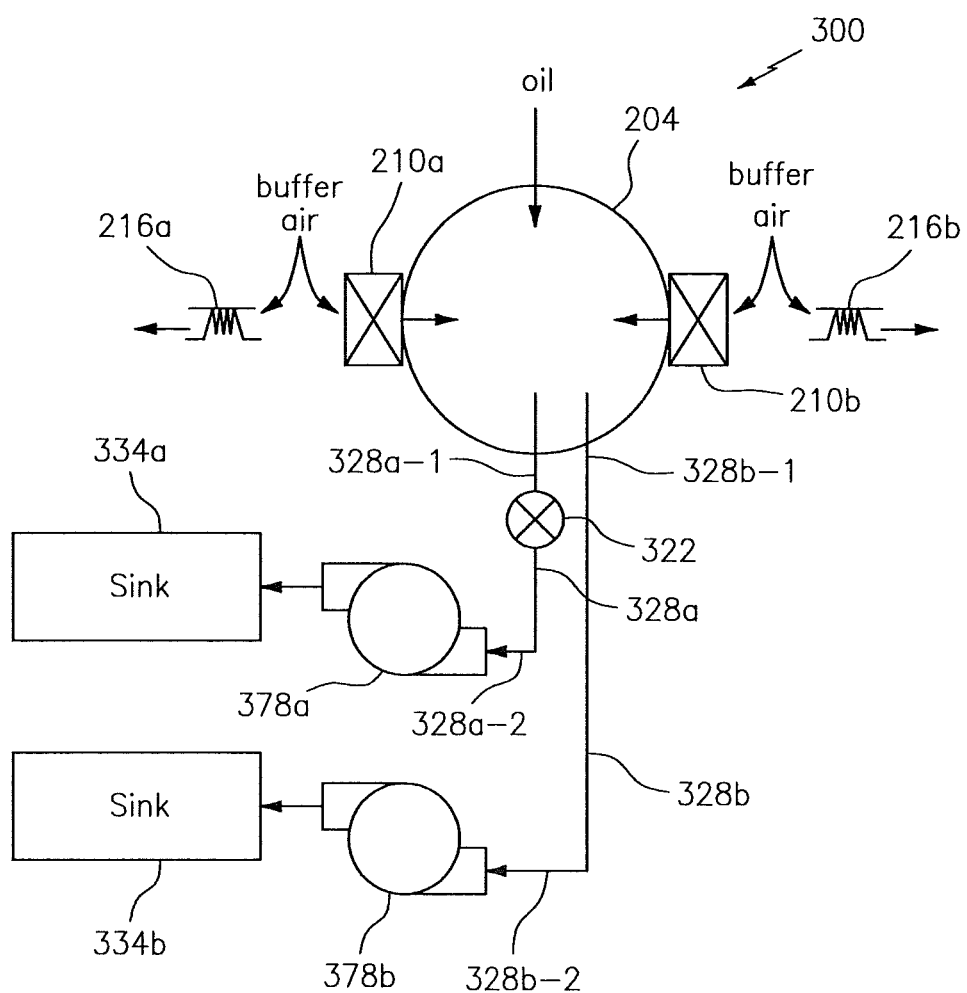
FIG. 3 illustrates a system for scavenging oil from a bearing compartment in accordance with aspects of this disclosure.

Referring to FIG. 3, a system 300 for scavenging oil is shown. The system 300 may include the bearing compartment 204, the seals 210a and 210b, and the secondary seals 216a and 216b (cross-reference FIGS. 2A-2B). Additionally, the system 300 may include a first scavenge line 328a coupled to the bearing compartment 204 at a first end 328a-1 of the scavenge line 328a and a first pump 378a at a second end 328a-2 of the scavenge line 328a, a second scavenge line 328b coupled to the bearing compartment 204 at a first end 328b-1 of the scavenge line 328b and a second pump 378b at a second end 328b-2 of the scavenge line 328b, a first fluid reservoir/sink 334a coupled to the first pump 378a, and a second fluid reservoir/sink 334b coupled to the second pump 378b. While the sinks 334a and 334b are shown separately in FIG. 3, in some embodiments the sinks 334a and 334b may correspond to the same sink/may be common with one another.

As shown in FIG. 3, a valve 322 (which may correspond to the valve 222 of FIG. 2A) may be disposed in the first scavenge line 328a. The first pump 378a may have different operational parameters than the second pump 378b. For example, the first pump 378a may have a greater flow rate/capacity than the second pump 378b. While the pumps 378a and 378b are shown separately in FIG. 3, in some embodiments the first pump 378a and the second pump 378b may correspond to different stages of a given rotor/gear pump.

Figure 4:
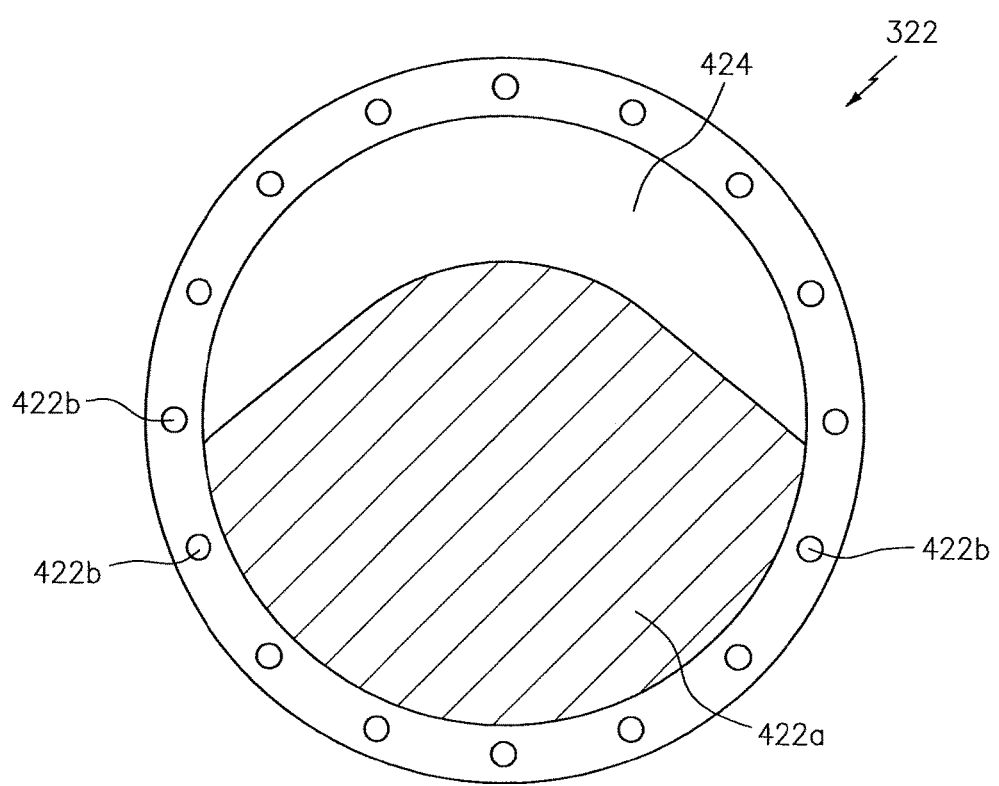
FIG. 4 illustrates a valve in accordance with aspects of this disclosure.

Referring to FIGS. 3 and 4, the valve 322 may include a flapper 422a, one or more bypass orifices 422b, and a primary flow valve passage 424. In operation the flapper 422a may selectively modulate a cross-sectional area of the primary flow valve passage 424. For example, during steady state/idle conditions the valve 322 (e.g., the flapper 422a) may be substantially or fully closed. However, the flapper 422a may remain at least partially open, allowing a relatively small volume of oil to flow through the primary flow valve passage 424 to avoid starving the first pump 378a of oil and/or components/devices associated with the sink 334a. Alternatively, or additionally, the valve 322 may include the one or more bypass orifices 422b that provide at least a threshold amount of oil to the first pump 378a, even when the flapper 422a is substantially or fully closed. In this respect, during the steady state/idle conditions the first pump 378a may be prevented from substantially drawing oil and air out of the bearing compartment 204 via the first scavenge line 328a. As such, a relatively small differential pressure (e.g., a differential pressure in an amount that is less than a threshold) may exist across the seals 210a and 210b.

A flapper 422a is indicative of an illustrative embodiment. Other mechanisms for controlling (e.g., restricting) a flow of fluid and/or pressurizing a compartment, such as for example a piston, an orifice, etc., may be used in some embodiments.

During a snap/transient condition (e.g., a rapid deceleration of an engine), the valve 322 (e.g., the flapper 422a) may be substantially or fully opened. The opening of the valve 322 may serve to quickly depressurize the bearing compartment 204 by causing the air in the bearing compartment 204 to be drawn out of the bearing compartment via the first pump 378a. In this manner, a large differential pressure across the seals 210a and 210b may be quickly eliminated/mitigated and thus the risk of oil leaking out of the bearing compartment 204 may be minimized/reduced.

The second scavenge line 328b, the second pump 378b, and the second sink 334b may be included in some embodiments for purposes of providing sufficient oil capacity in the system 300. The inclusion of the second scavenge line 328b, the second pump 378b, and/or the sink 334b may reduce concern over potentially elevated Mach numbers due to the additional scavenge line and flow area that is made available. Still further, the inclusion of the second scavenge line 328b, the second pump 378b, and/or the sink 334b may help to mitigate the risk/impact associated with different engine attitudes (e.g., an aircraft nose up or nose down condition) by providing multiple locations for acquiring oil from the bearing compartment 204. In some embodiments, one or more of the second scavenge line 328b, the second pump 378b, or the second sink 334b might not be included.

In some embodiments, the first scavenge line 328a may be substantially similar to the second scavenge line 328b. In some embodiments, a value of one or more parameters (e.g., a length, a diameter, a material, etc.) associated with the first scavenge line 328a may be different from corresponding/counterpart values of parameters associated with the second scavenge line 328b. Variation of the parameters associated with the first scavenge line 328a or the second scavenge line 328b may provide an ability to finely tune the pressurization/depressurization of the bearing compartment 204. Such fine tuning may be desirable if, for example, such fine tuning is not available with respect to the first pump 378a or the second pump 378b. Stated slightly differently, the cost of the pumps 378a and 378b may be minimized/reduced by allowing any fine tuning to be allocated to the first scavenge line 328a, the second scavenge line 328b, or even the valve 322 (in terms of, e.g., the degree of restriction to the flow of oil and air provided by the valve 322, which may be based on an extent to which the valve 322 is open or closed). This would also provide an ability to acquire/obtain the pumps 378a or 378b from a third party source/vendor without having to customize the pumps.

Aspects of the disclosure may be used to control a conveyance of one or more fluids. Such fluids may include, for example, a lubricant, a liquid/air mixture, etc.

Technical effects and benefits of this disclosure include an ability to minimize/reduce a differential pressure across seals coupled to a bearing compartment during steady state idle conditions in conjunction with an ability to quickly depressurize the bearing compartment upon a snap/transient condition.

The inclusion of a pump having a sufficiently large flow rate/capacity may help to mitigate risk associated with insufficient compartment pressure being present, such as during engine start-up and sub-idle conditions.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A system associated with a gas turbine engine, comprising:
   a bearing compartment;
   a scavenge line coupled to the bearing compartment at a first end of the scavenge line that receives a fluid via the first end of the scavenge line;
   a fluid pump coupled to the scavenge line at a second end of the scavenge line to receive the fluid; and
   a flow control valve having a variable flow area and disposed in the scavenge line to control flow of the fluid in the scavenge line and the fluid pump,
   wherein the flow control valve comprises at least one bypass orifice configured to provide at least a portion of the fluid through the flow control valve during a steady condition associated with an operation of the gas turbine engine.

2. The system of claim 1, further comprising:
   a seal,
   wherein the seal provides air to the bearing compartment during the steady state condition associated with the operation of the engine.

3. The system of claim 2, wherein the air is provided by a compressor section of the engine.

4. The system of claim 2, wherein a flow control mechanism of the flow control valve is substantially or fully closed during the steady state condition.

5. The system of claim 2, wherein a flow control mechanism of the flow control valve controls the variable flow area and is at least partially open during a transient condition associated with the operation of the engine.

6. The system of claim 5, wherein the transient condition corresponds to a deceleration of the engine.

7. The system of claim 1, further comprising:
a fluid reservoir that receives fluid from the fluid pump.

8. The system of claim 7, wherein the fluid reservoir includes a gearbox.

9. The system of claim 1, further comprising:
first and second seals coupled to the bearing compartment.

10. The system of claim 9, further comprising:
a third seal coupled to the first seal; and
a fourth seal coupled to the second seal.

11. The system of claim 1, further comprising:
a second scavenge line coupled to the bearing compartment at a first end of the second scavenge line; and
a second fluid pump coupled to the second scavenge line at a second end of the second scavenge line.

12. The system of claim 11, further comprising:
a first fluid reservoir coupled to the pump; and
a second fluid reservoir coupled to the second pump.

13. The system of claim 12, wherein the first fluid reservoir and the second fluid reservoir are common with one another.

14. The system of claim 12, wherein the first fluid reservoir is different from the second fluid reservoir.

15. The system of claim 11, wherein a first maximum flow capacity of the fluid pump is greater than a second maximum flow capacity of the second fluid pump.

16. The system of claim 11, wherein a first value of a parameter of the scavenge line is different from a second value of the parameter of the second scavenge line.

17. The system of claim 16, wherein the parameter is one of a length, a diameter, or a material.

* * * * *

UNITED STATES PATENT AND TRADEMARK OFFICE
CERTIFICATE OF CORRECTION

PATENT NO. : 10,450,894 B2  
APPLICATION NO. : 15/362049  
DATED : October 22, 2019  
INVENTOR(S) : Witlicki et al.

Page 1 of 1

It is certified that error appears in the above-identified patent and that said Letters Patent is hereby corrected as shown below:

In the Claims

Column 6, Lines 53-54, please delete "steady condition" and insert --steady state condition--

Signed and Sealed this
Twenty-sixth Day of November, 2019

Andrei Iancu
*Director of the United States Patent and Trademark Office*